United States Patent [19]

Zehner et al.

[11] 4,449,209

[45] May 15, 1984

[54] UTILIZATION OF ENTIRE TRANSMITTED BANDWIDTH IN CONTINUOUS TRANSMISSION FM SONAR

[75] Inventors: William J. Zehner, Lynn Haven; David P. Skinner, Panama City, both of Fla.

[73] Assignee: The United States of America as represented by the Secretary of the Navy, Washington, D.C.

[21] Appl. No.: 338,787

[22] Filed: Jan. 11, 1982

[51] Int. Cl.³ ............................................. G01S 15/34
[52] U.S. Cl. ................................. 367/102; 343/5 NQ
[58] Field of Search ............ 367/101, 102; 343/5 NQ, 343/14

[56] References Cited

U.S. PATENT DOCUMENTS

| | | | |
|---|---|---|---|
| 3,140,461 | 7/1964 | McKinney | 367/102 |
| 4,384,291 | 5/1983 | Lewis et al. | 343/5 NQ |
| 4,398,275 | 8/1983 | Zehner | 367/102 |

Primary Examiner—Richard A. Farley
Attorney, Agent, or Firm—Robert F. Beers; Harvey A. David

[57] ABSTRACT

A continuous transmission FM sonar avoids target ambiguities while utilizing the entire transmitted bandwidth for echo analysis. The sonar is characterized by digital generation of direct and quadrature versions of the transmitted frequency sweep, and balanced modulators responsive thereto to effect complex demodulation of the returned signals prior to analysis, as by a fast fourier transform frequency analyzer for target detection.

6 Claims, 2 Drawing Figures

UTILIZATION OF ENTIRE TRANSMITTED BANDWIDTH IN CONTINUOUS TRANSMISSION FM SONAR

BACKGROUND OF THE INVENTION

The present invention relates to frequency modulated echo ranging systems and more particularly to sonic ranging systems which produce a continuous target indication.

The echo ranging systems used in the past for locating underwater objects have operated on the principle of transmitting sound energy in the direction of the target and receiving a portion of the transmitted energy which is reflected back from the target. Since sound waves in ocean water travel at a substantially constant rate of about 1500 meters per second, the difference between the time of transmission of the sound energy and the time of reception of the reflected energy provides an accurate measure of the range to the target. Some of those ranging systems transmitted a series of discrete pulses separated in time from each other by an interval more than the transit time of the energy to and from a target at the maximum range of the equipment, and since the propagation rate of sound in ocean water is slightly less than a mile per second, the spaces between pulses must be several seconds. Such a system is therefore capable of searching an area only at very low speeds, although the operating range may be quite considerable.

However, for many applications, the slow rate of search of the pulsed sonic echo systems is a distinct disadvantage in maintaining contact with targets and, to overcome these disadvantages, CTFM (continuous transmission frequency modulated) sonar systems have been devised. These systems employ a continuously radiating sinusoidal oscillator whose frequency is caused to vary cyclically between fixed limits. The reflected energy has the same frequency as the energy impinging on the target, and is combined in the receiver with the output of the oscillator to produce a heterodyne or beat frequency. It will be apparent to those skilled in the art that the reflected energy will be delayed by the transit time to and from the target, and will therefore be of a different frequency than that of the oscillator, and that the difference between the two frequencies will be a measure of the distance to the target.

Historically, because of a characteristic inability to distinguish ambiguous range indications for certain targets, CTFM sonars have analyzed only a fraction (10 to 30%) of the transmitted bandwidth. Since broadband transducers are difficult to manufacture, this practice is an expensive waste of bandwidth. The bandwidth has been used to produce a "guard band" of ranges within which targets cannot produce ambiguous range indications.

The ambiguous range indications result when the energy reflected from a distant target arrives during a succeeding transmission sweep cycle and, when mixed with the then transmitted frequency, produces a difference frequency that is the negative of the difference frequency that would correspond to a closer target. Heretofore, no distinction could be made between such positive and negative frequency difference signals by known CTFM sonar signal processors. Even with no guard band at all, one-half of the transmitted bandwidth has been the most that could be used for range analysis.

Differentiation between positive and negative frequency difference signals has been accomplished by the technique known as complex demodulation in cases wherein at least one of the frequencies from which the difference signals are derived is fixed rather than variable as in the case of an FM sonar. As a matter of pratice, the complex demodulation technique has been regarded as difficult, if not impossible, to implement for signals $f_r(t)$ having non-zero bandwidth because of the difficulty of generating a 90 degree phase shift at other than a single frequency. This has been because conventional phase shifting, or quadrature, signal generators have utilized inductive, reactive, capacitive, and the like components and circuits that are effective only at predetermined selected frequencies. Accordingly, complex demodulation has heretofore been unavailable for use in an FM sonar system.

SUMMARY OF THE INVENTION

With the foregoing in mind, it is a principal object of this invention to provide apparatus that enables utilization of substantially the entire transmitted bandwidth for range analysis processing in a continuous transmission FM sonar system.

Another object is the provision of a signal generation and processing system, in a CTFM sonar, that enables differentiation between positive and negative difference frequencies, whereby the ambiguity of target indications can be properly resolved.

Still another object is to accomplish the foregoing through the use of complex demodulation.

As yet another object of the invention aims to provide a novel and particularly effective apparatus for effecting complex demodulation in an FM sonar system.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
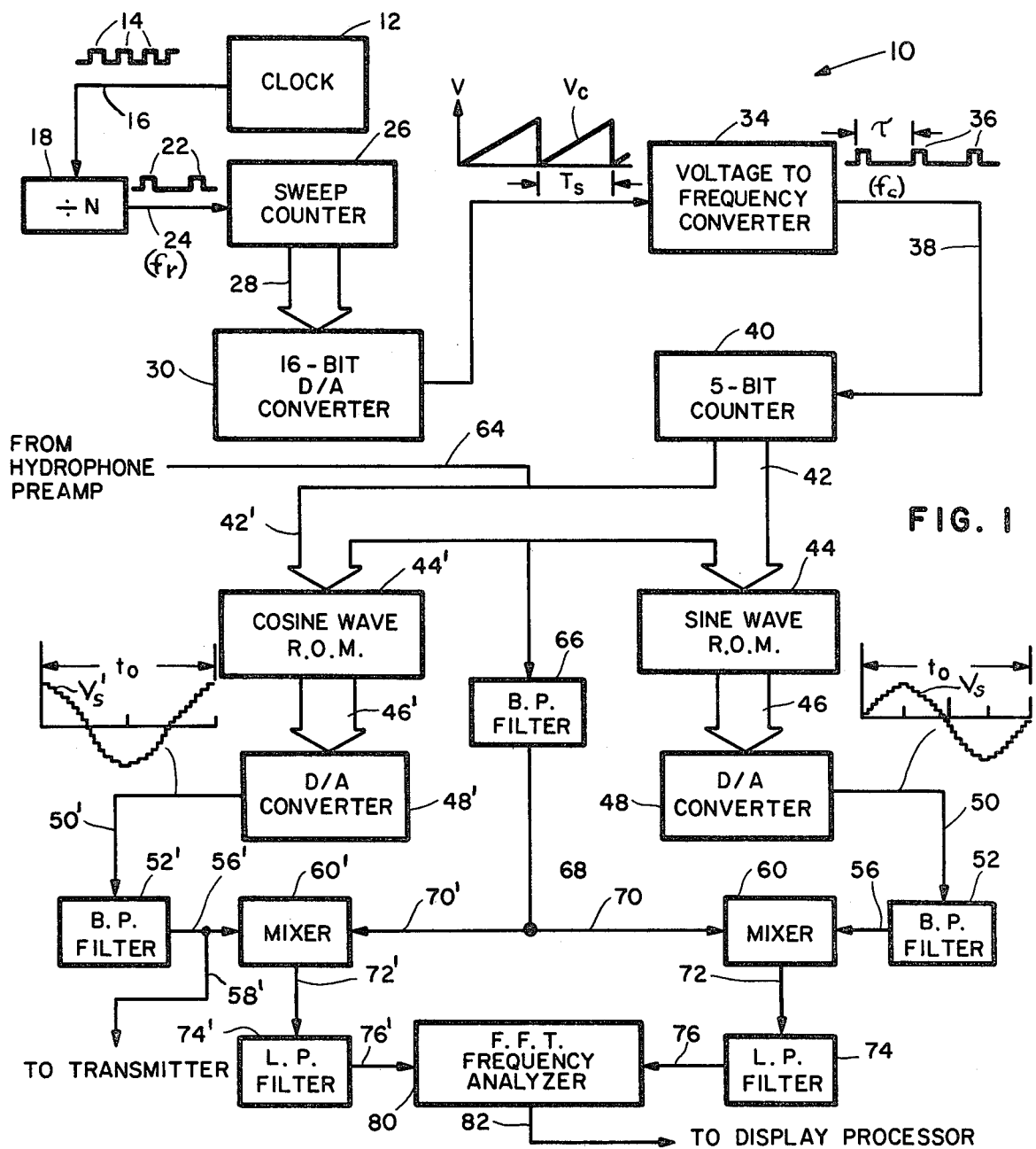
FIG. 1 is a diagrammatic illustration, in block form, of a CTFM signal generation and complex demodulation system embodying the invention.

In the exemplary form of the invention illustrated in FIG. 1 and described hereinafter, the signal generation and complex demodulation system 10 comprises a crystal controlled oscillator or other stable source 12 of clock pulses 14 at a predetermined rate or clock frequency $f_c$. The clock pulses 14 are applied, as shown by line 16, to a divider 18 which reduces the clock frequency by a factor N to provide output pulses 22 at a step rate frequency $f_r$. The pulses 22 are applied, as shown by line 24, as an input to a sweep counter 26. Counter 26, which is of a conventional binary type, has a 16 bit digital output, represented by broadline 28, or $2^{16}$ counts for each sweep period $T_s$, applied to a commercially available 16 bit digital-to-analog converter 30.

The converter 30 provides a voltage ramp output $V_c$, line 32, that is the smoothed result of $2^{16}$ voltage steps, that are so accurately similar and accurately spaced by the step rate frequency pulses 22, that the voltage ramp $V_c$ is highly linear. The voltage ramp $V_c$ is applied to a highly linear, commercially available voltage to frequency converter 34, the output of which is a series of pulses 36 on line 38, the repetition periods $\tau$ of which are inversely proportional to the voltage of the input ramp. Thus, the pulse frequency $f_c = 1/\tau = KV_c$, where K is a constant.

The pulses 36 are applied to a 5 bit digital counter 40, the binary word output 42 of which is representative of the pulse frequency $f_c$ and is used to access an ROM (read only memory) 44. The ROM 44 is programmed to provide a digital (binary word) output 46 representing points along a sinewave corresponding in frequency with the binary word input 42. The output 46 of ROM 44, of course, changes with changes in the input 42, and is applied to a digital to analog converter 48 that produces a voltage output $V_s$ on line 50 that is a 32 stepped approximation of a sinewave having a period $t_o$ and a frequency $f_o$, where $$f_o = 1/t_o = f_c/32.$$

The synthesized, stepped sinewave output $V_s$ of converter 48 is bandpass filtered at 52 to provide a frequency modulated signal, line 56, having a swept frequency $f_o$ that increases in frequency with the same linearity as is exhibited by the output $V_c$ of the digital to analog converter 30. The output of the filter 52 is fed via line 56 to a mixer 60 forming one of a balanced modulator pair in which received echo signals of frequency $f_e$ are demodulated by being heterodyned with the transmitted frequencies as part of the complex demodulation later discussed in more detail.

The binary output 42 of the counter 40 is further applied, as shown by line 42', to access a second ROM 44' that is programmed to provide a digital (binary word) output 46' representing points along a cosine curve corresponding in frequency with the binary word input 42'. The output 46' of ROM 44', of course, changes with changes in the input 42', and is applied to a digital to analog converter 48' that produces a voltage output $V_s'$ on line 50' that is a 32 stepped approximation of a cosine wave which, like the sinewave of line 50, has a swept frequency $f_o$ and a corresponding period $t_o$.

The synthesized, stepped cosine wave output $V_s'$ of converter 48' is bandpass filtered at 52' to provide a frequency modulated output signal, line 56', that is accurately always 90° out of phase with the frequency modulated signal of line 56 and is fed via line 58' to drive the transmitter power amplifier at the swept or modulated frequency $f_o$. The output on line 56' is also fed to the second mixer 60' of the mentioned balanced modulator pair wherein received signals are mixed or heterodyned for further use in the mentioned processing.

The received signal inputs to the balanced modulators 60 and 60' are derived from the receiving hydrophone preamp output, line 64, which output is bandpass filtered by filter 66 and applied as shown by lines 68, 70 and 70' to the respective balanced modulators for heterodyning. Each of the modulators produces a signal having two frequency terms corresponding to the sum and the different frequencies of the received and transmitted frequency inputs thereto. Thus, the modulator 60 provides as its output on line 72 sum and difference frequencies relative to the frequency modulated sinewave input on line 56, while the modulator 60' provides as its output on line 72' sum and difference frequencies relative to the frequency modulated cosine wave input on line 56'. The sum frequencies are rejected by low-pass filters 74 and 74', respectively, and the remaining terms, which represent the real (R) and imaginary (I) components of a signal whose amplitude is calculated as $\sqrt{R^2 + I^2}$, and whose phase $TAN^{-1}$ (I/R). These real and imaginary components are passed by the filters 74, 74' as shown respectively by lines 76, 76' as inputs to a conventional fast fourier transform frequency analyzer 80 which can readily distinguish between positive and negative terms when presented with complex input signals.

Figure 2:
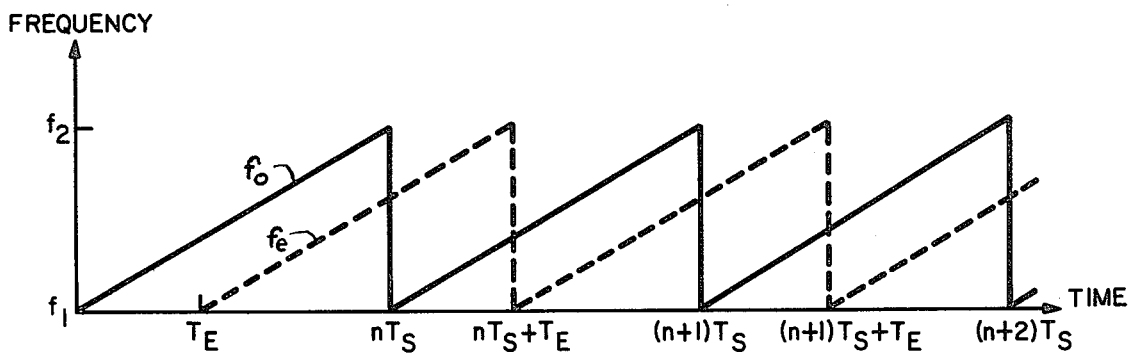
FIG. 2 is a graphic illustration of certain frequency and time relationships characteristic of operation of the system of FIG. 1 in a CTFM sonar.

Mathematically this can be expressed as follows:

The signal corresponding to the nth transmitted sweep, referring to the frequency sweep characteristics of FIG. 2, is $$s(t) = \cos(2\pi f_o(t - nT_s) + a_s(t - nT_s)^2)$$

where $nT_s < t < (n+1)T_s$, $f_o$ is the carrier frequency, $a_s$ is the sweep rate, and $T_s$ is the sweep duration. With C being the speed of sound in water, the received echo corresponding to this signal from a target at range $(C^T E)/2$ is $$r(t) = \cos(2\pi f_o(t - nT_s - T_E) + a_s(t - nT_s - T_E)^2 + \phi), \quad \text{(Eq.1)}$$

where $\phi$ is an arbitrary phase, and the maximum delay of interest is $T_s$, i.e., $0 < T_E < T_s$. The range delay may be obtained by multiplying the received echo by the complex form of the transmitted signal $$S_c(t) = \cos(2\pi f_o(t - nT_s) + a_s(t - nT_s)^2) + j\sin(2\pi f_o(t - nT_s) + a_s(t - nT_s)^2),$$

where $nT_s < t < (n+1)T_s$ and filtering out the sum frequency terms to yield the demodulated output signal $$d(t) = \cos(2a_s T_E t + \phi') + j\sin(2a_s T_E t + \phi'), \quad \text{(Eq. 2a)}$$

where $nT_s + T_E < t < (n+1)T_s$ $$= \cos(2a_s(T_E - T_s)t + \phi'') + j\sin(2a_s(T_E - T_s)t + \phi''), \quad \text{(Eq. 2b)}$$

where $(n+1)T_s < t < (n+1)T_s + T_E$ where $\phi'$, and $\phi''$ are arbitrary phases. From this expression we see that two frequencies are gnerated at the demodulator output: one proportional to the echo delay $T_E$ and the other proportional to the ambiguous delay $(T_E - T_s)$. Clearly, these can be distinguished based on their sign if one can distinguish positive from negative frequencies, as is readily done within a FFT analyzer.

Conventional processing utilizes only the real part of d(t) which forces the spectrum to be an even function of frequency and thus does not permit the discrimination of the positive and negative frequency contributions to d(t). Inclusion of the complex terms cancel the negative frequency portion of Equation (2a) and the positive frequency portion of (2b) allowing discrimination of the real and ambiguous targets.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims. For example, the invention contemplates that the transmitted insonification signal $f_o$ can be derived from the sine or the cosine signal generating portions of the described apparatus. It will also be recognized by those skilled in the art to which the invention pertains that the mathematical discussion would be in terms of the sine function if derived from that portion. Moreover, while sine and cosine curves were used in the preferred embodiment, it is the 90°, or direct and quadrature, relation therebetween that is critical and the curves may be other than sine and cosine.

What is claimed is:

1. A continuous transmission frequency modulated sonar of the type wherein a target range signal is generated in proportion to the difference frequency between a varying transmission frequency that varies linearly during repetitive frequency sweeps and the frequency of a return signal, said sonar comprising:
   signal generating means for simultaneously generating direct and quadrature signals at said varying transmission frequency, one of said direct and quadrature signals being used to project an insonification signal;
   complex demodulator means, responsive to said direct and quadrature signals and to said return signal, for providing first and second outputs including first and second sum and first and second difference frequencies, respectively, said difference frequencies being characterized as positive when the target is at such a range that the return signal is received during a predetermined frequency sweep and being characterized as negative when the target is at such a range that the return signal is received during a subsequent sweep;
   first and second filter means, responsive to said first and second outputs of said demodulator means for rejecting said sum frequencies and passing said first and second difference frequencies; and
   means, responsive to said first and second difference frequencies, for providing target range signals corresponding only to said first and second difference frequencies characterized as positive, whereby ambiguous target range signals are avoided.

2. A continuous transmission frequency modulated sonar as defined in claim 1, and wherein said signal generating means comprises:
   a source of first pulses at a first frequency;
   first counter means, responsive to said first pulses, for repeatedly counting to a predetermined count;
   means, responsive to the changing count in said first counter means, for providing incremental changes in a voltage ramp output;
   means responsive to said voltage ramp output, for providing second pulses at a second frequency that changes in pulse rate with the voltage of said ramp output;
   second counter means, responsive to said second pulses, for providing a first digital output corresponding with the pulse rate of said second frequency;
   first memory means, responsive to said first digital output to provide a second digital output corresponding to successive points along a first predetermined cyclical waveform that changes in frequency in accordance with changes in said second frequency;
   second memory means, responsive to said first digital output to provide a third digital output corresponding to successive points along a second predetermined cyclical waveform that changes in frequency in accordance with changes in said second frequency;
   means, responsive to said second digital output, for providing a first varying voltage output as said direct signal; and
   means, responsive to said third digital output, for providing a second varying voltage output as said quadrature signal.

3. A continuous transmission frequency modulated sonar as defined in claim 2, and wherein:
   said means, responsive to said second digital output, comprises a digital-to-analog converter and a second band-pass filter.

4. A continuous transmission frequency modulated sonar as defined in claim 3, and wherein:
   said complex demodulator means comprises first and second mixers coupled respectively to the outputs of said first and second band-pass filters.

5. A continuous transmission frequency modulated sonar as defined in claim 4, and wherein:
   said means, responsive to said first and second difference frequencies comprises a fast fourier transform device.

6. A continuous transmission frequency modulated sonar as defined in claim 5, and wherein:
   said first memory means comprises a first read only memory and said first predetermined cyclical waveform comprises a sinewave;
   said second memory means comprises a second read only memory and said second predetermined cyclical waveform comprises a consinewave.

* * * * *